April 17, 1962  M. C. GODDARD ETAL  3,029,691
APPARATUS FOR MAKING COLOR PRINTS
Original Filed June 25, 1956  2 Sheets-Sheet 1
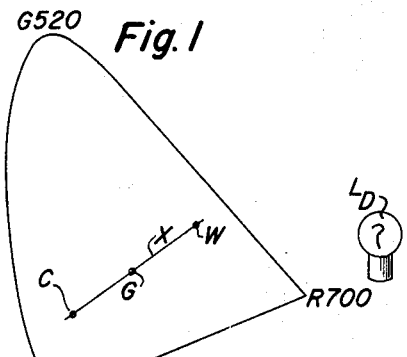
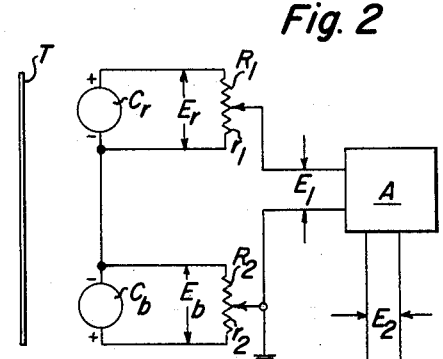
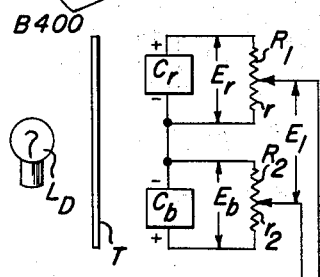
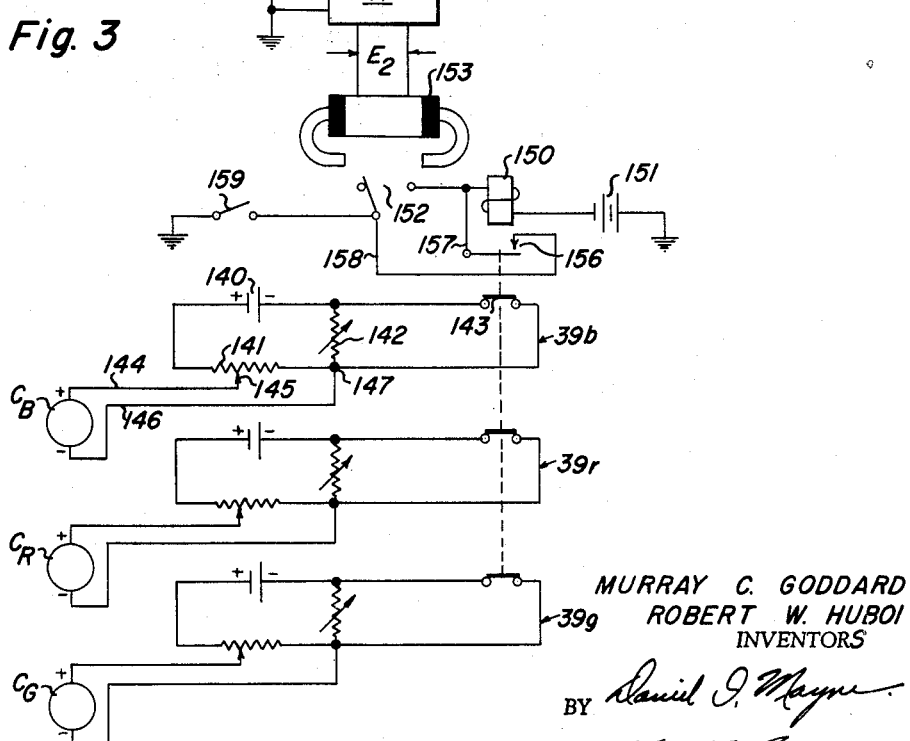
MURRAY C. GODDARD
ROBERT W. HUBOI
INVENTORS
BY
ATTORNEYS

MURRAY C. GODDARD
ROBERT W. HUBOI
INVENTORS

BY
ATTORNEYS

United States Patent Office 3,029,691
Patented Apr. 17, 1962

3,029,691
APPARATUS FOR MAKING COLOR PRINTS
Murray C. Goddard, Penfield, and Robert W. Huboi, Webster, N.Y., assignors to Eastman Kodak Company, Rochester, N.Y., a corporation of New Jersey
Original application June 25, 1956, Ser. No. 593,616. Divided and this application Nov. 17, 1958, Ser. No. 774,189
3 Claims. (Cl. 88—24)

The present invention relates to the making of photographic color prints, and particularly to a new approach to the determination of the exposure for the photographic printing of negative or positive color transparencies which have been exposed by different types of illuminants.

This application is a division of U.S. application Serial No. 593,616, filed June 25, 1956.

In previous exposure determination systems for making color prints, the red, green and blue integrated transmittances of the transparency to be printed have been taken as a measure of the variation from normal camera exposure conditions. Other variations such as the effects of improper storage of the film, manufacturing and processing variations, etc. have also been detected in this way. These errors have been corrected for by balancing each of these integrated transmittances to intensities which would, in combination, print gray or a hue near gray on the printing material. In other words, such systems fully corrected all transparencies to "gray" or a hue near gray and were thus based on an exposure determination system where all transparencies were balanced to a single aim point in color space, i.e., gray or a hue near gray. Such printing systems are disclosed in U.S. Patents 2,571,697, Evans, and 2,566,264, Tuttle et al. These printing systems gave very satisfactory results on the average. One reason why they did give such results was that there were two types of color films, one balanced for daylight exposure and the other balanced for artificial light.

We have found, however, that there are residual color errors in prints made by these known methods of printing which reflect the undesirable color variations in the color transparency. While when using color films balanced for different types of illumination such color residual errors are not too noticeable, in the case of printing a new universal, or dual purpose, color film, these residual errors are large enough to be objectionable. This new universal, or dual purpose, color film is one which may be exposed by illuminants of differing spectral energy composition, i.e., either daylight or artificial illumination, as distinguished from previous single purpose color films which were balanced for use with only one kind of light, i.e., only daylight or artificial light. Another distinction of this new universal color film is that no color correction is made during its exposure, but all color correction is made during printing. These residual color errors differ from other color errors in that they tend to be grouped in color space according to the type of illuminant, i.e., daylight or artificial, used in the camera exposure.

U.S. application Serial No. 593,616, of which this application is a division, relates to a new system of printing exposure determination for the printing of negative or positive color transparencies which have been exposed by any type of illuminant and which selectively uses two different printing aim points, i.e., printing balances, one for transparencies exposed by daylight and the other for transparencies exposed by artificial light.

One object of the present invention is to provide a "discriminator" for determining whether a transparency was exposed by daylight or artificial light.

And another object is to combine this "discriminator" with a color printer having at least two printing aim points so that the printing aim points of the printer are automatically selected in accordance with the discrimination made by said "discriminator."

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings, in which:

FIG. 1 is a CIE chromaticity diagram to aid in explaining the theory behind the present invention;

FIG. 2 is a diagram of an electronic discriminator constructed according to a preferred embodiment of the present invention for automatically discriminating a color transparency to be printed according to the type of illuminant it was exposed by;

Figure 4:
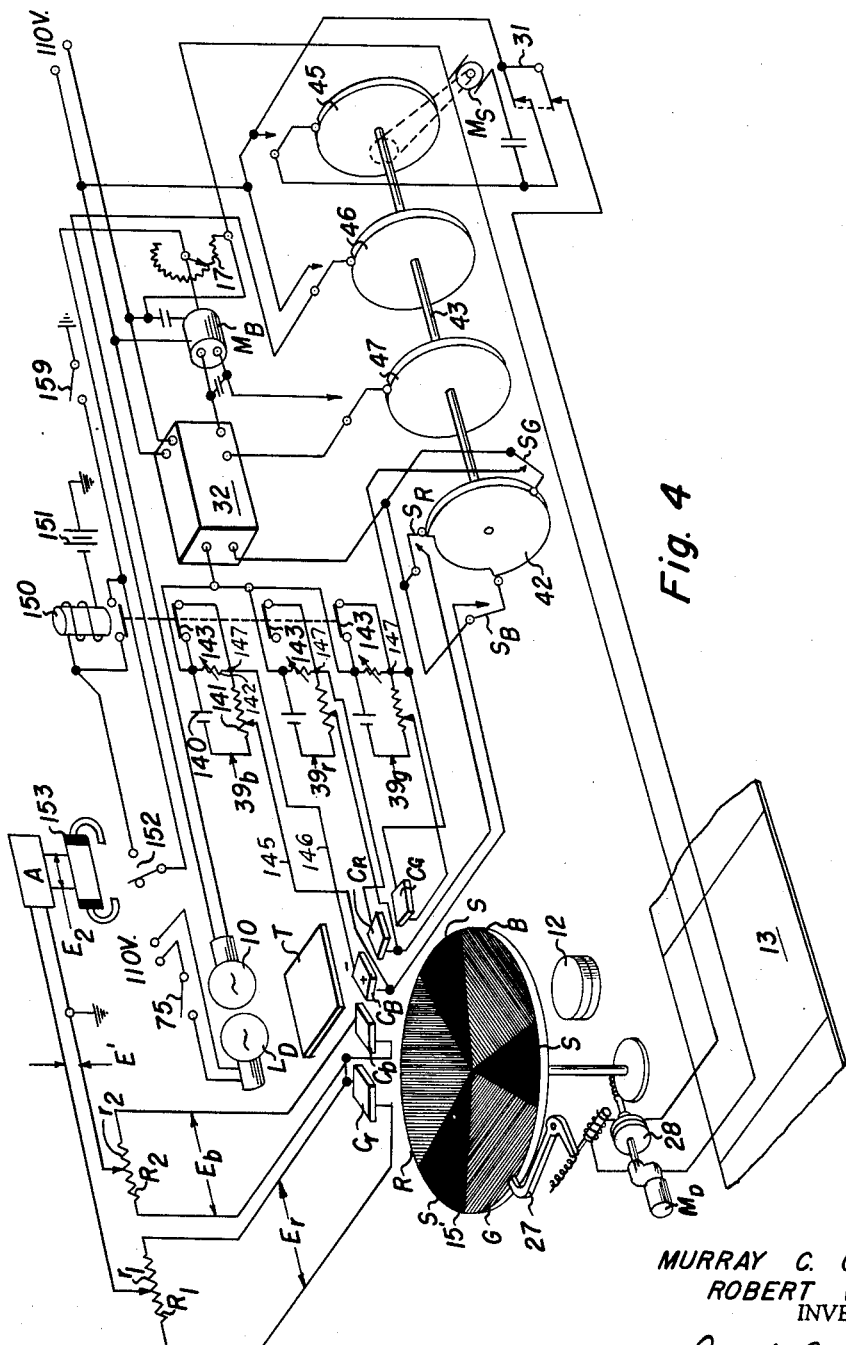

FIG. 3 is a diagram showing how the discriminator of FIG. 2 may be used to automatically shift the aim points of a color printer in accordance with the present invention; and FIG. 4 is a diagrammatic view, in perspective, showing how the discriminator of FIG. 2 may be combined with a conventional automatic color printer so that the printing aim points are automatically shifted to correct for residual errors due to the type of illuminant used in exposing the color transparency to be printed in accordance with the present invention.

The novel method of color printing to which the present invention relates can probably be best illustrated as a modification of a method of exposure determination for color printing described in the above-noted Evans Patent 2,571,697. Evans discloses a method of correcting photographic color images during printing which is based on the idea of integrating the color transparency to gray and thus adjusts the color of the printing beams so that the colors in the final print will appear in such proportion that they will integrate to gray or to a neutral shade. He does this by integrating the light transmitted by a color transparency and adjusting the transmitted light until it is that color as determined by the amount of primary red, green and blue light therein, which will print substantially gray on the color-sensitive printing material, and then prints with the light as so adjusted. While Evans mentions the fact that it is not always desirable, either actually or theoretically, to integrate exactly to neutral gray, but possibly a hue near gray, he always integrates the transparency to a single aim point.

As pointed out in copending application Serial No. 593,616, it was found that while integrating to gray, or a hue near gray, on the average compensates for many color errors, such a simple method of correction is not sufficiently effective in compensating for errors due to color variability. As mentioned previously, there are residual color errors in the prints which reflect the undesirable color variations in the color transparency. In the case of printing the new universal, or dual purpose, color films, i.e, a color film which may be exposed by illuminants of differing spectral energy composition, such as daylight or artificial light, these residual errors are large enough to be objectionable. They differ from other color errors in that they tend to be grouped in color space according to the type of illuminant (i.e., daylight or artificial light) used in the camera exposure.

It was found that these residual color errors can best be corrected for by integrating the transparency being printed to one of two different aim points in color space depending upon the illuminant used to expose the transparency rather than integrating the transparency to gray or any single aim point. These aim points are obtained by two different printing exposures and the proper aim point, or preselected printing exposure, is selected after discriminating as to whether the transparency to be printed was exposed to daylight or artificial light.

The residual color errors due to illuminant variations between daylight and artificial light occur along the indigo-orange axis X of the CIE chromaticity diagram as shown in FIG. 1. For example, daylight illuminants are usually characterized by the presence of relatively more energy in the blue portion of the spectrum than is the case with artificial illuminants. The latter usually contain relatively more red and less blue energy than daylight or simulated daylight. This indicates that the aim points for the red and blue printing exposures must be adjusted according to the illuminant used in exposure of the film. Throughout this specification and the claims, the term "daylight" is used to designate an illuminant having an effective color temperature of approximately 6150° K., while the term "artificial light" is used to designate an illuminant having an effective color temperature of approximately 3850° K.

It was found that color prints from color transparencies exposed by artificial light tend to be too "warm," while prints from transparencies exposed by daylight are generally too "cold." The proposed method of printing corrects the printing exposures to one of two aim points located in color space on opposite sides of the gray point and substantially equidistant from it. These aim points W (warm) and C (cold) may be connected by a line, passing through the gray point G (gray) which lies on the indigo-orange axis X of the CIE chromaticity diagram of FIG. 1. The gray point G lies halfway between these two points or, stating it another way, the distance between these aim points W and C is approximately equal to twice the distance of either aim point from the gray point. The separation between the aim points W and C along the indigo-orange axis may be expressed in terms of printing exposure difference necessary to bring two like transparencies made on the same material and exposed by high (daylight) and low (artificial light) color temperature illuminants to full correction or the gray point G. The hues of these aim points W and C are complementary to the hues of the residual color errors when printing by a method which corrects all the way to gray or point G as suggested by the above-noted Evans patent. Thus, according to the present invention, a transparency exposed by artificial light will now be printed at the blue-cyan aim point C, while a transparency exposed by daylight will be printed at the red-yellow aim point W; and, on the average, there will be no residual illuminant error observable in the prints.

The method of printing color transparencies to which the present invention relates is applicable to systems for control of printing exposure including: white light exposure; sequential exposure to red, green and blue light; and simultaneous exposure to red, green and blue light. It may be used with either manual or automatic printing systems regardless of whether they use the variable-intensity, constant-time, or constant-intensity, variable-time, principles of exposure control. If the printer in question uses the variable-intensity, constant-time principle of exposure control, then the intensity of the printing light is adjusted to one of two values which will correct to the described aim points. On the other hand, if the constant-intensity, variable-time principle of exposure control is used, then the time of printing for each color is adjusted to one of two values which will correct to the described aim points.

In the simplest form of carrying out this invention, the printer is provided with two preselected exposure controls adjusted to correct to the two aim points which can be selected by manually throwing a switch between two positions. Then the operator, after determining whether the transparency be printed was exposed by daylight or by artificial light, will throw the switch which will give the appropriate printing exposure to correct the print to the proper aim point. If a printer is used which is based on the variable-intensity, constant-time principle of exposure control and automatically balances the intensity of the printing light to one of two different selected values commensurate with the aim points in question, i.e., above-noted U.S. Patent 2,566,264, Tuttle et al., then the transparencies to be printed could be discriminated automatically as to the type of illuminant they were exposed by. Such a system of discrimination is described below.

In the manual sense the operator can discriminate the transparencies visually in some instances. For example, if the operator views a transparency and observes that it is a beach scene, he can safely say that the film was exposed by daylight. Likewise, if he views the transparency and observes an indoor scene of a Christmas tree and fireplace, he can safely say that the film was exposed by artificial light and select the proper printing aim point to correct for residual color errors due to the illuminant used in exposing the film. However, this visual method of discriminating the transparencies is subject to human error and is not conducive to use with automatic printing systems.

We have found that illuminant variations may be detected in color transparencies by examination of the transmittance values. The variations resulting from illuminant differences are maximized by comparison of the blue and red transmittance characteristics of the color transparency. This method may be represented as $$\Delta = \frac{T_r}{T_b} - K \qquad (1)$$

where:

$T$ = integrated transmittance of the transparency
$r$ and $b$ = red or blue light
$K$ = a constant
$\Delta$ = the discriminant function In the case of a color negative exposed by a daylight illuminant, the blue transmittance would be small and the red transmittance would be relatively large compared to the same transparency exposed by artificial light. The constant K represents the median hue value, halfway between the average hue of all negatives exposed to daylight, or high color temperature illuminants, and the average hue of all negatives exposed to artificial light, or low color temperature illuminants. For example, K would approximately correspond to the ratio of red and blue transmittances of an average negative exposed to an illuminant of an effective color temperature of 4750° K. This color temperature is about midway between the average color temperature of artificial illuminants, 3850° K., and the average color temperature of daylight illuminants, 6150° K. This constant K should correspond in color negatives to the "gray" point in printing exposures mentioned in the noted Evans patent, except that where the dye image and masking components do not normally form a neutral (as in some color films) this point will not necessarily be gray or neutral, but a point close thereto also mentioned in the Evans patent.

The discriminant function $\Delta$ will equal zero or a positive value for a daylight-exposed transparency. A negative value for $\Delta$ will indicate a transparency exposed by artificial light. These red and blue transmittance values can be measured by light-sensitive cells positioned below the transparency to be printed and illuminated with a source of given intensity and color quality. Such cells should be covered with appropriate red and blue filters, or be otherwise selective in this color sense, and be arranged to measure the integrated light transmitted by the transparency rather than a selected point of interest therein.

Exactly the same discriminating result can be achieved by means of a density function of the form:

$$\Delta_D = D_b - D_r - C \qquad (2)$$

where:

$D_b$ and $D_r = -\log_{10} T_b$ and $-\log_{10} T_r$, i.e., density corresponding to the integrated transmittance $C = \log_{10} K$, where K is the constant of Equation 1

Rewriting Equation 2

$$\Delta_D = -\log_{10} T_b + \log_{10} T_r - C \quad (3)$$

at $\Delta_D = \Delta = 0$ from Equation 1

$$\frac{T_r}{T_b} = K$$

or $$\log_{10} T_r - \log_{10} T_b = \log_{10} K$$

substituting in Equation 3 for $\Delta = 0$ $$0 = \log_{10} K - C$$
$$C = \log_{10} K$$

Means will now be described for automatically measuring the red and blue transmittance characteristics of a color transparency that was made under illuminations of unknown color temperature to discriminate whether the transparency was exposed by daylight or artificial light. It will also be shown how this discriminator can also be used to automatically modify the exposure of an automatic printer to correct the transparency to the proper one of two different aim points dependent upon the type of illumination used in exposing the transparency. The film discriminator to be described is an electronic device which automatically discriminates between color transparencies according to the function $\Delta$ of Equation 1 or the function $\Delta_D$ of Equation 2. The discriminator can be combined with a printer to automatically change the printing exposure aim point of the printer by a predetermined amount when $\Delta$ or $\Delta_D$ changes from a positive to a negative value or vice versa.

The universal, or dual purpose, film discriminator circuit constructed according to a preferred form of the present invention is shown schematically in a block diagram in FIG. 2. Light of a chosen color temperature from source $L_D$ passes through the full area of a color transparency T to be printed and falls on red- and blue-filtered photodetectors $C_r$ and $C_b$, respectively. The signals $E_r$ and $E_b$ from these photodetectors are proportional to the red and blue transmittances of the transparency and are the input to the discriminator. After suitable attenuation, these signals are subtracted from one another. The difference signal $E_1$ is suitably amplified by amplifier A to give voltage signal $E_2$. The amplified signal, $E_2$, corresponds to $\Delta$ in Equation 1 and operates a relay memory circuit 125 for one sign of $E_2$ but not for the opposite sign of $E_2$. This memory circuit can then be used to merely give the operator an appropriate signal designating the type of illuminant the transparency being discriminated was exposed by and in response to which signal the operator can then manually shift the aim point of a printer to be used. Or, as indicated in FIG. 2, the memory circuit may be connected to means in the printer for changing the red, green, and blue printer aims, here designated by boxes $39_r$, $39_g$ and $39_b$ and thus automatically shift the over-all aim point of the printer.

It will now be shown that this circuit solves Equation 1 which states $$\Delta = \frac{T_r}{T_b} - K$$

or indicates whether $\Delta$ is greater or less than zero.

The output of a photodetector is, under suitable conditions, approximately $$E_i = m_i T_i \quad (4)$$

where:

$T_i$ = integrated transmittance of the color transparency
$m_i$ = constant dependent on the photodetector's sensitivity, circuit characteristics, filter characteristics, color transparency characteristics, and light source intensity and spectral distribution
$i$ = red ($r$) or blue ($b$)

From the photodetector circuit of FIG. 2

$$E_1 = \left(\frac{r_1}{R_1}\right)E_r - \left(\frac{r_2}{R_2}\right)E_b \quad (5)$$

substituting Equation 4 in 5

$$E_1 = \left(\frac{r_1}{R_1}\right)m_r T_r - \left(\frac{r_2}{R_2}\right)m_b T_b \quad (6)$$

solving Equation 1 for $T_r$ and substituting in Equation 6

$$E_1 = \left(\frac{r_1}{R_1}\right)m_r(\Delta + K)T_b - \left(\frac{r_2}{R_2}\right)m_b T_b \quad (7)$$

$$E_1 = T_b\left[\left(\frac{r_1}{R_1}\right)m_r(\Delta + K) - \left(\frac{r_2}{R_2}\right)m_b\right] \quad (8)$$

It is desired that $E_1 = 0$ when $\Delta = 0$ $$\therefore \left(\frac{r_1}{R_1}\right)m_r K = \left(\frac{r_2}{R_2}\right)m_b \quad (9)$$

or $$\left(\frac{r_1}{R_1}\right) = \frac{m_b\left(\frac{r_2}{R_2}\right)}{K m_r} \quad (10)$$

substituting Equation 10 in Equation 8

$$E_1 = T_b\left[\frac{m_b\left(\frac{r_2}{R_2}\right)}{K m_r}m_r(\Delta + K) - \left(\frac{r_2}{R_2}\right)m_b\right] \quad (11)$$

$$E_1 = m_b\left(\frac{r_2}{R_2}\right)T_b\left[\frac{\Delta + K}{K} - 1\right] \quad (12)$$

$$E_1 = \frac{m_b\left(\frac{r_2}{R_2}\right)}{K}T_b\Delta$$

$\therefore E_1$ is $> 0$ when $\Delta > 0$ (daylight)

$E_1$ is $< 0$ when $\Delta < 0$ (artificial light)

As will probably be obvious, the attenuation of the output of the red and blue photodetectors $C_r$ and $C_b$ by potentiometers $R_1$, $r_1$ and $R_2$, $r_2$ is provided in order to adjust the discriminator circuit so that a positive or zero value of $E_1$ will designate a transparency exposed to daylight, and a negative value will designate a transparency exposed by artificial light. Since this ratio $$\left(\frac{T_r}{T_b}\right)$$

when compared to the constant K must give this desired sign relation, the outputs of the red and blue photodetectors $C_r$ and $C_b$ must be adjusted relative to one another to satisfy this desired set of conditions. For example, if two representative transparencies of the same subject are made, one being exposed by daylight and the other by artificial light and these are discriminated individually by photodetectors $C_r$ and $C_b$, the potentiometers $R_1$, $r_1$ and $R_2$, $r_2$ are adjusted until the output signal $E_1$ is positive for the daylight exposed transparency and negative for the transparency exposed by artificial light. Then after this initial adjustment of the discriminator circuit, all succeeding transparencies measured thereon will be properly discriminated by the sign of output voltage $E_1$. If it be considered that the light source $L_D$ would always be a fixed value, then either potentiometer $R_2$, $r_2$ or potentiometer $R_1$, $r_1$ would not be necessary. For such a condition the output of the blue cell $C_b$ could be taken as unity and the output of red cell $C_r$ adjusted by potentiometer $R_1$, $r_1$ to a fraction of the $C_r$ output, or the output of the red cell $C_r$ could be taken as unity and the output of the blue cell $C_b$ adjusted by the potentiometer $R_2$, $r_2$, to satisfy the equation $$\Delta = \frac{T_r}{T_b} - K$$

in the sense that a positive $\Delta$ would indicate one type of illuminant and a negative $\Delta$ would indicate the other type of illuminant.

As pointed out above, this discriminator may be readily combined with any one of the several known types of automatic color printers to automatically discriminate the transparency prior to printing and automatically adjust the printer aim point in accordance with such discrimination. FIG. 3 shows diagrammatically how this discriminator may be combined with an automatic color printer of the type shown in FIG. 7 of U.S. Patent 2,566,264, Tuttle et al. In this patented color printer the transparency to be printed is uniformly illuminated by a source of white light and the printing material is given successive exposures to red, green and blue light by indexing red, green and blue filters into the transparency transmitted beam. The printer operates on the constant-time, variable-intensity exposure principle and the printer has an exposure control system which integrates or balances all transparencies to gray. This is accomplished by successively measuring the integrated transmittance of the transparency for each of the three colors (red, green and blue) through the use of filtered photodetectors. For balancing purposes, these photodetectors are connected in closed loop relation with a compensating potential and the output of this detector loop controls a servo motor which alters the intensity of the printing source until the intensity of each color transmitted by the transparency equals a preselected value which in combination will print as gray on the printing material, after which the printing material is exposed by the transmitted beam as so adjusted. In the Tuttle et al. printer the compensating potential which determines the preselected intensity to which the transparency transmitted beam is adjusted is shown as an adjustable source of potential 39 and is adjusted to integrate and balance the prints to gray.

In accordance with the present invention, the printer should have two different printing aim points, one for balancing to aim point W in color space for transparencies exposed by daylight and the other for balancing to aim point C in color space for transparencies exposed by artificial light. This can be accomplished by substituting for the single compensating potential 39 of the Tuttle et al. printer a dual compensating potential (one for each of two different aim points) which can be selectively connected in closed loop relation with the photodetector cells for balancing the printing light intensity to one or the other of said two different preselected values.

Referring now to FIG. 3, this can be accomplished by providing a dual compensating potential circuit designated generally at $39_b$ which consists of a battery 140 connected in a circuit including a resistance 141, an adjustable resistance 142 and a switch 143. The photodetector $C_B$ is connected in bucking relation with the output of the compensating circuit by a lead 144 connected to resistance 141 through an adjustable tap 145 and a lead 146 connected at the junction 147 of resistors 141 and 142. With the switch 143 closed as shown, the resistance 142 is shorted out of the compensating circuit and the output thereof against which the photodetector $C_B$ is balanced is determined by that portion of the resistance 141 selected by the setting of tap 145. When the switch 143 is opened, however, resistance 142 is put back in the compensating circuit and a new bucking potential for the photodetector is obtained. Accordingly, the two aim points for the printer can be initially determined by a proper setting of resistance 142 and tap 145 on resistance 141 and then these two aim points can be chosen in accordance with the discrimination of the transparency by merely opening and closing switch 143.

Since in actual practice the intensities of the red, green and blue printing lights are not adjusted to the same preselected intensity for printing purposes, it is preferred to have a separate compensating circuit for each of the colors against which each of the corresponding color photodetectors is balanced. Accordingly, if the dual compensating circuit just described is designated the blue one, as designated by the subscript, then there will be a similar one for red, shown as $39_r$, and green, shown as $39_g$, which are connected into bucking relation with a photodetector, $C_R$ and $C_G$, of the corresponding color.

As in the printer shown in the above-noted Tuttle et al. patent, the outputs of each of these loop circuits is connected into the amplifier of a servo system to control the energization of a two-phase reversible balancing motor which controls a rheostat in the printing lamp circuit. As also disclosed in the Tuttle et al. patent, each of these closed loop detector circuits will be connected into the servo system in synchronized relation with the color filter as it is moved into the printing beam so that just before or when the red filter is moved into the printing beam, the red photodetector $C_R$ and red compensating loop $39_r$ will be connected to the servo amplifier and the red printing light will be adjusted to a preselected intensity; then when the green filter is moved into the printing beam, the green photodetector $C_G$ and green compensating loop $39_g$ will be connected to the servo amplifier and the red disconnected, and so on for the blue.

The selection of the proper one of the two aim points of the printer can be made automatically by the discriminator if each of the switches 143 of compensating circuits $39_b$, $39_r$ and $39_g$ is made a pair of contacts of a relay 150 as shown in FIG. 3. Then so long as the relay 150 remains de-energized, these switches 143 remain closed to shunt out the adjustable resistance 142 and set the compensating potentials at one preselected value. If, on the other hand, the relay 150 is energized, the switches 143 are opened and each of the compensating potentials is adjusted to the second preselected value or aim point. The coil of relay 150 is connected in a circuit including a source of potential 151 connected to ground and a normally open switch 152. This switch 152 forms a part of a polarized relay 153 which is energized only when the output voltage $E_2$ is of a positive sign. This polarized relay 153, switch 152, and relay 150 constitute the relay memory circuit 125 in the block diagram of the discriminator shown in FIG. 2 and the three compensating potential circuits $39_b$, $39_r$ and $39_g$ correspond to the means for changing the printer aim points in this FIG. 2. The input $E_2$ to the polarized relay then comes from a discriminator such as shown in FIG. 2 and including a lamp $L_D$ for illuminating the color transparency T to be printed, and the red and blue discriminating cells $C_r$ and $C_b$ which are hooked in closed loop relation with their difference in output $E_1$ being fed into amplifier A. When a transparency T which has been exposed by daylight is discriminated, the output signal $E_2$ from the discriminator will be positive, whereas for a transparency exposed by artificial light, it will be zero or negative. Now if the compensating circuits $39_b$, $39_r$, $39_g$ are adjusted so that when the switches 143 are closed the circuits are set for the printing aim point C, or that to which transparencies exposed by artificial light should be corrected, see FIG. 1, then polarized relay 153 will be so selected as to be normally in the position shown and will be energized to change the aim point when the signal $E_2$ from the discriminator is positive. Relay 150 includes a switch 156 which closes a hold-in circuit including lines 157 and 158 so that the selected printer aim points will be held in for the duration of the printing cycle. Another switch 159 can be placed in line 158 and will open this hold-in circuit at the end of a printing cycle and this can be operated by any suitable means at the end of the printing cycle, i.e., by means of the transparency gate of the printer moving to an "out" or "loading" position. Or this switch 159 could be operated by the cam 45 of the noted Tuttle et al patent at the end of one revolution thereof.

While this discriminator may be combined with any type of known color printer, in FIG. 4 it has been shown in combination with a color printer of the type shown in FIG. 7 of noted Tuttle et al. Patent 2,566,264. In this printer the transparency T to be printed is illuminated by a source of light 10 and is imaged by a lens 12 onto an area of color printing material 13. The explosure of the printing material is given successive red, blue and green exposures of equal time duration and this is accomplished by intercepting the printing beam by a tri-color filter disk 15' having a red sector R, a blue sector B, and a green sector G, each separated from each other by an opaque sector S. This filter disk is constantly driven at a known speed by a reduction motor $M_D$ operating through a friction clutch 28 and this disk is stopped and held in a starting position by a solenoid-operated latch 27 adapted to engage a notch in the edge of the disk.

The intensity of the printing light for each color must be adjusted to a preselected value, and to this end a blue filtered photodetector $C_B$, a red filtered detector $C_R$ and a green filtered detector $C_G$ are located to integrate the light transmitted by the transparency. The output of each of these detectors is connected in closed loop relation with a compensating potential for adjusting the intensity of each color beam to a preselected value. In Tuttle et al., since this printer integrated to "gray," the intensity of each color was balanced to the same value, hence, a single compensating source 39 was used. However, according to the present method of printing, the desired intensity of each of the color beams may be different and should have two aim points instead of one. Accordingly, the compensating potential source 39 of Tuttle et al. is replaced by the three compensating sources $39_b$, $39_r$, $39_g$ shown and described in connection with FIGS. 2 and 3. Each of these compensating sources and its corresponding detector cell $C_R$, $C_B$, $C_G$ is connected in succession to the amplifier 32 of the control circuit by cam 42 and switches $S_B$, $S_R$ and $S_G$ in synchronism with rotation of the filter disk as in the Tuttle et al. printer.

The unbalance of each closed loop circuit is fed into the amplifier 32 of a self-balancing servo system as before so that the servo motor $M_B$ will drive the rheostat 17 to properly adjust the intensity of the printing source 10 to the preselected value determined by the compensating circuits $39_b$, $39_r$ and $39_g$ in succession. As before, cam shaft 43 is driven by motor $M_S$ so that cams 42, 47, 46 and 45 control the proper sequencing of the printing steps.

The discriminator of the present invention is shown combined with this printer so that it can discriminate the transparency while it is in printing position but before the printing operation starts. To this end, the discriminating cells $C_r$ and $C_b$ are disposed below the transparency gate to scan the transmitted beam along with the detector cells. Since the discriminator requires a light source of a given color temperature, a separate source of light $L_D$ has been shown above the negative which may be controlled by a switch 75. If desired, the printing source 10 could be used for discriminating by providing some means for automatically applying a certain voltage to the printing lamp 10 to produce the desired color temperature light source needed for discrimination. The relay 150 of the discriminator is connected to the switches 143 of the compensating circuits $39_b$, $39_r$ and $39_g$ to shift the aim points of the printer in accordance with the discriminator output.

After the discrimination step has been completed, which takes about 0.3 second, the start button 31 of the printer is pushed and the printer goes through the printing operation just as described in Patent 2,566,264. The only difference is that it is adjusting the intensity of each of the color beams to a different preselected value, rather than the same value, i.e., integrating to gray, and each of these different preselected values can be one of two different values as determined by the discriminator. If it were desired to make this printer completely automatic, the switch 75 for starting the discriminator could be tied up with the start switch 31 of the printer through a time delay relay, not shown, having a delay time equal to the discriminating time. Then all that would be necessary to start the printer would be to close switch 75 to start the discriminator and then after a fixed time allowed for the discriminator to properly adjust the aim points of the printer, the time delay relay would operate the switch 31 to start the printer.

The present method of printing has been described thus far in terms of a two-step discontinuous printing function wherein one of two sets of red, green and blue equations is chosen on the basis of a discriminant function $\Delta_D$:

$$\left.\begin{array}{l}\log_{10} F_i = A_i + a_i D_i \text{ (for } \Delta_D \geq 0) \\ \log_{10} F_i = B_i + a_i D_i \text{ (for } \Delta_D < 0)\end{array}\right\} \quad (13)$$

where $B_i = A_i + X_i$
$X_i$ = illuminant bias
$i$ = red, green or blue
$F_i$ = source flux;
$B_i$ and $A_i$ = aim points;
$a_i$ = correction coefficient; and
$D_i = -\log T_i$ Experiments have proved that for use with a universal, or dual purpose, film such a printing system will provide an appreciable quality improvement over that provided by the simple non-discriminating printing system taught by noted patent to Evans and which integrates all transparencies to "gray" or a hue near gray.

A further improvement may be realized by the use of N discriminated printing functions, where $N > 2$. The number of illuminant-bias increments required is a function of the effective correction level represented by the coefficient $a_i$. As the effective correction level is decreased, the number of bias increments required to provide a given total quality is increased. Such a system can be represented mathematically by:

$$\left.\begin{array}{ll}\log_{10} F_{iA} = A_i + a_i D_i & (\text{for } \Delta_D \geq C_A) \\ \log_{10} F_{iB} = A_i + X_i + a_i D_i & (\text{for } C_A \geq \Delta_D > C_B) \\ \log_{10} F_{iC} = A_i + 2X_i + a_i D_i & (\text{for } C_B \geq \Delta_D > C_C) \\ \vdots & \\ \log_{10} F_{iN} = A_i + NX_i + a_i D_i & (\text{for } C_{(N-1)} \geq \Delta_D > C_N)\end{array}\right\} \quad (14)$$

where
$C_{A,B,C...N}$ = boundary values
$X$ = correction bias increment
$i$ = red, green or blue The discriminator shown in FIG. 2 could be made to operate for N values of C by using N taps on the resistors $R_1$ or $R_2$ instead of one. A separate relay would memorize the results of each of the N decisions about the sign of output signal $E_1$.

The net effect produced by the discontinuous printing system represented by Equations 14 can be achieved by means of a continuous non-discriminating system in which the illuminant-bias adjustment is a continuous function of the blue and red transmittance or density characteristics of the transparency. For example, if X is made a continuous function of $\Delta_D$ such that it is proportional to the magnitude of $\Delta_D$, the printing function of Equations 13 becomes:

$$\log_{10} F_i = A'_i + m_i \Delta_D + a_i D_i$$
$$= A'_i + m_i(D_b - D_r - C) + a_i D_i$$
$$= A'_i - m_i C + m_i D_b - m_i D_r + a_i D_i \quad (15)$$
$$= A'_i + m_i D_b - m_i D_r + a_i D_i$$

Expanded in terms of red, green and blue printing, Equation 15 becomes:

$$\log_{10} F_r = a_{r0} + a_{r1} D_r + a_{r3} D_b$$
$$\log_{10} F_g = a_{g0} + a_{g2} D_g \quad (16)$$
$$\log_{10} F_b = a_{b0} + a_{b1} D_r + a_{b3} D_b$$

The red and blue density terms of $\log_{10} F_g$ are neglected because the illuminant correction is primarily required in blue and red printing. However, there are other factors, such as film age, storage conditions, prevailing scene attributes, etc., which may tend to produce systematic residual color errors in prints produced by full correction integrating systems in addition to those produced by illuminant color variations in color film exposure. Under certain conditions, grouping of these other color errors may tend to combine with the illuminant errors to produce grouping along some axis or axes in color space, other than the indigo-orange axis. In such a case, the discriminant function $\Delta_D$ becomes a function of all three color densities:

$$\Delta_D = D_b + k_1 D_g + k_2 D_r \quad (17)$$

The weighting factors $k_1$ and $k_2$ depend upon the extent to which these other effects shift the axis of color error grouping from the indigo-orange direction.

When $k_1$ is appreciably greater than zero, the correction bias ($X_i$) becomes significant for green printing in Equations 13 and 14. Similarly, the printing Equation 16 must be expanded to the following form for maximum print quality:

$$\log_{10} F_i = \alpha_{i0} + \alpha_{i1} D_r + \alpha_{i2} D_g + \alpha_{i3} D_b \quad (18)$$

where $i$=red, green or blue

To satisfy these conditions where the correction bias ($X_i$) becomes significant for green printing, another element, such as the output of a green filtered photodetector, might be added to the discriminator of FIG. 2 by means of a linear network. Such a discriminator would operate on the function:

$$\Delta_D = D_b + a D_g + b D_r + C$$

A continuous discrimination function is also possible in the disclosed discriminator. One way of generating such a function would be to continuously adjust the values of $r_1$ or $r_2$ (FIG. 2) with a servo system to make $E_1=0$. An appropriate memory of the values of $r_1$ and/or $r_2$ and an exposure modifying system would be necessary.

It is possible to determine more nearly optimum printing exposures for color transparencies made on universal, or dual purpose, film by means of the printing functions described than has been possible with any previously disclosed functions, i.e., printing to "gray" or a hue near gray. Equations 13, 14, 16 and 18, respectively, represent increasingly complex methods of minimizing the residual illuminant and other color errors in prints made from color transparencies on the basis of large-area transmission density of the transparency or other total transmittance functions. The net quality gain of each method is primarily dependent upon the effective correction level provided by the basic printing exposure determination system which it modifies and the nature of the color transparency population printed. While the invention has been described in terms of control of source flux, it applies to variable time printing as well.

Values of the constants in the equations given are dependent upon the nature of the color transparency population and also upon the form of density or transmittance criteria used. Therefore, the specific values of those constants must be determined by means of analysis of the particular density or transmittance data for a realistic sample of that color transparency population.

This discrimination method of printing is subject to some limitations in the case of scenes involving an extreme preponderance of certain hues. However, transparencies involving such scenes are uncommon and tend to produce poor prints in any printing system based on large-area transmission characteristics of the transparency. This limitation is not peculiar, then, to the discrimination method outlined above but is associated with the type of exposure determination criterion described.

While we have shown and described certain specific embodiments of our invention, we are aware that many modifications thereof are possible. Our invention, therefore, is not to be limited to the specific structural details shown and described, but is intended to cover all modifications coming within the scope of the appended claims.

Having thus described our invention, what we claim as new and desire to secure by Letters Patent of the United States is:

1. In a color printer for making a color print from a color transparency made on a dual purpose film exposed by either daylight or artificial light, the combination of means for uniformly illuminating said transparency comprising a light source including the three primary colors; a lens for projecting an image of said transparency onto a sheet of color sensitive printing material adapted to be located in the image plane of said lens; a red sensitive photodetector disposed to integrate and measure the red light transmitted by said transparency; means for automatically varying the amount of exposure of said printing material to the red light transmitted by said transparency, and thereby varying the red printing aim point, until the red exposure is equal to one or the other of two preselected values depending upon the character of the illuminant by which the transparency was exposed, and including a source of variable reference potential variable between two values, each of which corresponds to a different one of said two preselected values of red exposure; means connecting said photodetector in closed loop relation with said reference potential whereby the red exposure is adjusted in accordance with any output signal from said closed loop; and means for discriminating between color transparencies according to the type of illuminant they were exposed by and adjusting said reference potential to one of said two values if the transparency was exposed by daylight and adjusting the reference potential to said other value if the transparency was exposed to artificial light.

2. In a color printer according to claim 1 in which said last mentioned means includes a discriminator for discriminating between color transparencies according to the type of light they were exposed by and comprising means for illuminating the transparency with light of a given color temperature, a first photodetector for measuring the integrated red transmittance of said transparency, a second photodetector for measuring the blue transmittance of said transparency, means for connecting said photodetectors in closed loop relation to compare their outputs, and means for automatically adjusting said reference potential between said two values in accordance with the polarity of the signal from the discriminator representing the ratio of the red and blue transmittance of the transparency.

3. In a color printer according to claim 1 in which said last mentioned means includes a discriminator for discriminating between color transparencies according to the type of light they were exposed by and comprising means for illuminating the transparency with light of a given color temperature, a first photodetector for measuring the integrated red transmittance of said transparency, a second photodetector for measuring the blue transmittance of said transparency, means for connecting said photodetectors in closed loop relation to compare their outputs, and means for automatically adjusting said reference potential between said two values in accordance with the polarity of the signal from the discriminator representing the ratio of the red and blue transmittance of the transparency, said last mentioned means including a polarized relay adapted to adjust said reference potential between said two values and normally adjusting said reference potential to one of said values, and means for impressing the signal from the discriminating photodetector loop onto the coil of said relay whereby the relay will shift from its normal position only when the signal impressed thereon has a polarity opposite to that by which the relay is polarized.

References Cited in the file of this patent

UNITED STATES PATENTS

| | | |
|---|---|---|
| 2,273,356 | Holven et al. | Feb. 17, 1942 |
| 2,544,196 | Varden | Mar. 6, 1951 |
| 2,565,399 | Simmon | Aug. 21, 1951 |
| 2,566,264 | Tuttle et al. | Aug. 28, 1951 |
| 2,571,697 | Evans | Oct. 16, 1951 |
| 2,757,571 | Loughren | Aug. 7, 1956 |
| 2,847,903 | Modney | Aug. 19, 1958 |
| 2,921,498 | Simmon et al. | Jan. 19, 1960 |